Figure 1:
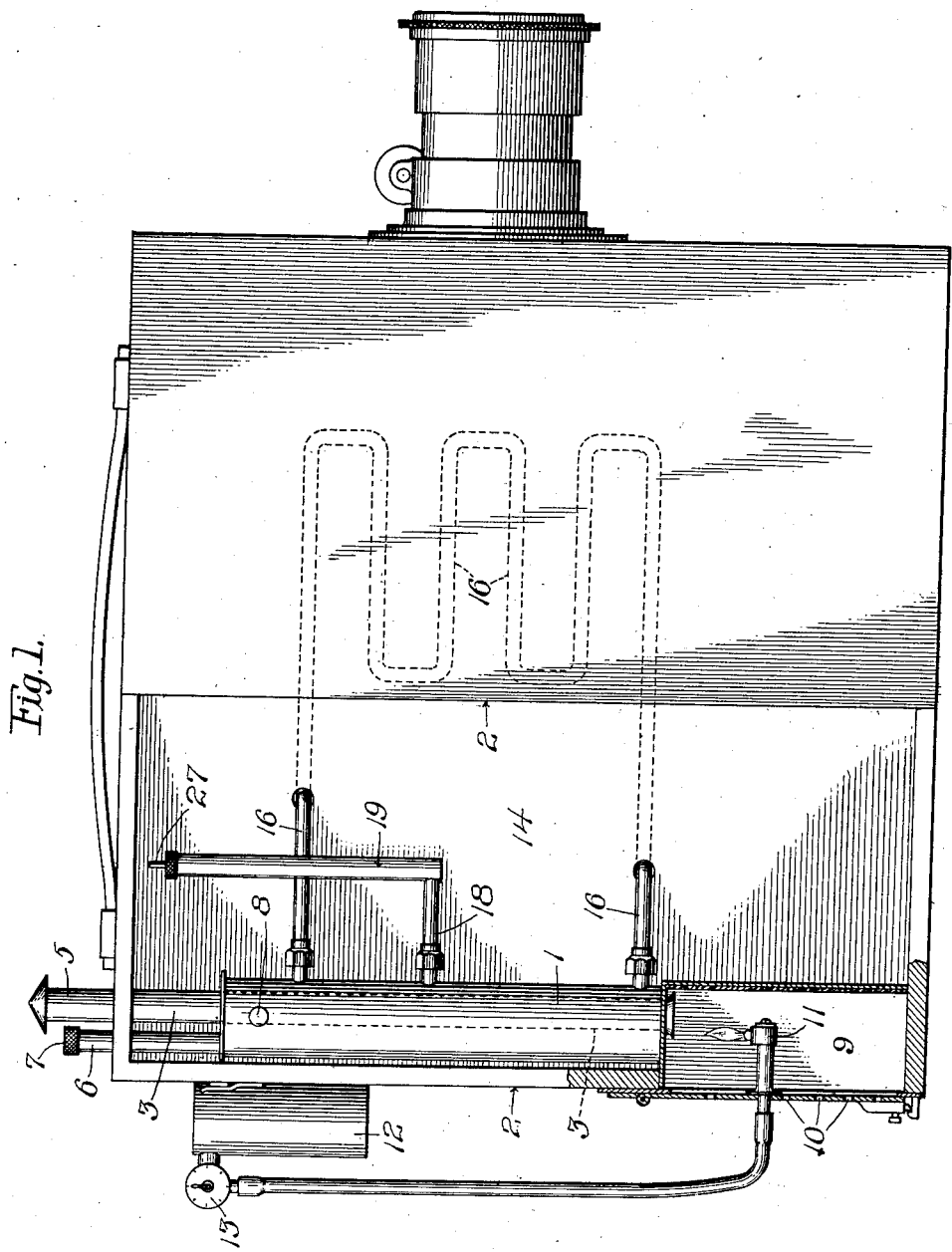

A. C. FORSBERG & H. C. SCHLICKER.
MOTION PICTURE CAMERA.
APPLICATION FILED JAN. 6, 1914.

1,098,031.

Patented May 26, 1914.
2 SHEETS—SHEET 1.

A. C. FORSBERG & H. C. SCHLICKER.
MOTION PICTURE CAMERA.
APPLICATION FILED JAN. 6, 1914.
1,098,031.
Patented May 26, 1914.
2 SHEETS—SHEET 2.
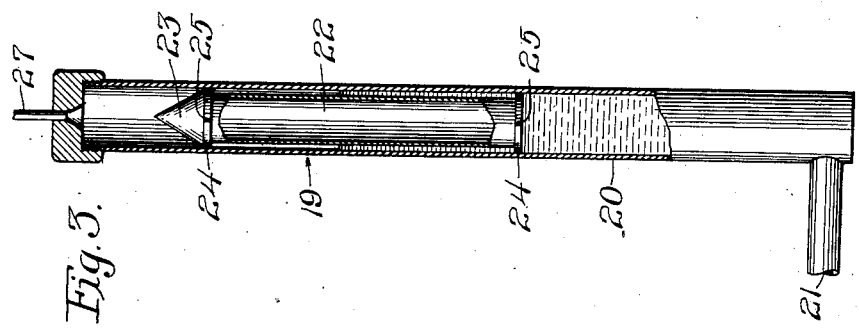
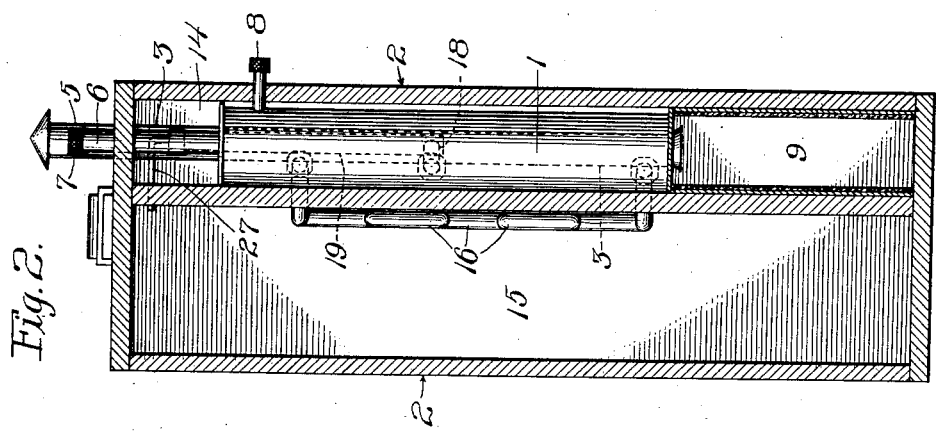

UNITED STATES PATENT OFFICE.

AXEL C. FORSBERG AND HERMAN C. SCHLICKER, OF NEW YORK, N. Y., ASSIGNORS TO MATTHEW M. LOORAM, OF NEW ROCHELLE, NEW YORK.

MOTION-PICTURE CAMERA.

1,098,031. Specification of Letters Patent. Patented May 26, 1914.

Application filed January 6, 1914. Serial No. 810,654.

*To all whom it may concern:*

Be it known that we, AXEL CONRAD FORSBERG, a subject of the King of Sweden, and HERMAN C. SCHLICKER, a subject of the Emperor of Germany, and residents of New York, in the county of New York and State of New York, have invented certain new and useful Improvements in Motion - Picture Cameras, of which the following is a specification.

This invention relates to motion picture cameras. Great losses arise in this art from films spoiled by electrical markings, otherwise known as "static." It is true that various expedients have been tried. It is of course known to all that the presence of moisture in air has the effect of lessening the effect of static electricity. Unfortunately the electrical markings are very persistent, as the rapidly moving strip of celluloid acts both frictionally and by static induction to generate electricity, and in practice, and under present conditions, an operator never knows when he is taking a picture whether it will turn out spoiled by electrical markings or not. There are various kinds of electrical markings, for example, "velvet static," "friction static," and "glass static," and sometimes an expedient which cures one of these, fails to cure another, so that the film is spoiled nevertheless. The trouble is not so much due to the loss of the film, as to the fact that the photograph will have to be entirely re-taken, frequently at great expense. Sometimes, this is altogether impossible. Therefore, the motion picture camera art is in great need of something which can reliably cure this "static" or electrical markings. Of course, nothing is successful which cannot be depended upon under all conditions, because if a film is spoiled even occasionally it is a source of great vexation.

The use of a steam jet has been experimentally tried by applicant HERMAN C. SCHLICKER in the handling of films in a dark room, the room being filled with steam in this way, and electrical markings prevented, but this plan cannot be used in a camera because the steam will fog the lens. Even a small quantity of steam condenses on the lens and this coating is absolutely fatal to making pictures. In fact it appears that it is not possible to use any steam at all. This is true because steam, (by which is understood water gas of sufficient tension to actually displace atmospheric air) actually soon condenses and takes the form of minute drops of water surrounded by a coating of air which adheres closely on the surface of the water and thereby keeps the finely divided drops suspended against gravity. But these drops of water, altogether very small, are nevertheless real water drops, and are absolutely distinct from a true gas, a gas being a state where the individual molecules are absolutely free, one from another. Any such water drops, no matter how small, circulating around in the interior of the camera, come in contact sooner or later with the lens and stick to it, and directly interfere with the refraction of the light. Therefore, it is absolutely necessary not to have any steam in a camera, the word "steam" meaning the finely divided mist resulting from the condensation of actual gaseous steam, developed above the boiling point of water. Moreover, the presence of water in the finely divided state just mentioned moistens the film, softens the emulsion, lessens the sensitiveness and causes the film to stick and tear, and is for many reasons impractical. The state of the art therefore consists in the known fact that moisture has a tendency to lessen the effect of static electricity, coupled with the known fact that water will not ordinarily evaporate in sufficient quantities to sufficiently moisten the air, and the further fact that steam cannot be used for the reasons just mentioned.

By way of further explanation for the purposes of enabling this invention to be fully carried out, it may be mentioned that when water evaporates under any temperature less than boiling point, it passes into a perfect gas which however is not steam as commonly understood. This gas will pass off from water very freely in a partial or complete vacuum for example, at once destroying the vacuum, the space being thereupon occupied by this water vapor gas to a pressure of perhaps a few pounds gage pressure, just as is the case in the vacuum condenser of a steam engine. But while water will pass quickly into a vapor when in a vacuum, it will not do so except very slowly when the space around is occupied by air. It is true that water will pass into a vapor very slowly when surrounded by air, and ordinary atmospheric air contains a certain quantity of this water gas, sometimes almost the maximum amount possible. When this quantity is reached the air is said to be saturated. The degree of saturation is known as the humidity of the air, and is indicated by an instrument known as a hygrometer, which registers 100 per cent. when the air is fully saturated, and zero when the air is absolutely without any water vapor in it. These facts are merely stated in order that those in the art may fully understand the carrying out of the present invention.

The principle of the present invention consists in generating water vapor gas under conditions favorable to its development, just as such conditions are present, for example, in the vacuum condenser of a steam engine, and then after the water vapor is actually generated to afterward lead it into the air with which it mixes, just as any two gases mix, but without possibility of actually displacing any air at any time, with the certainty of subsequent condensations. In this way the air can instantly be brought to a condition as nearly approaching saturation as desired. Of course, the temperature of the air has an effect, because if the air is cold it will not permit as much water vapor to concurrently occupy the same space, as if the air is warm.

The invention consists in the features of improvement hereinafter set forth.

In the drawings, Figure 1 is a side elevation of a motion picture camera embodying the principles of this invention. Fig. 2 is a transverse vertical sectional view through the fire box looking forward. Fig. 3 is a detail sectional view of the "swimmer" as it has been termed.

Constructions embodying the invention will include a generator for hot water or equivalent liquid.

In the best constructions embodying the invention the boiler takes the form of a rather slender vertical tube 1 in the corner of the camera casing $a$ having a flue 3, running vertically therein from a fire box below. The flue is continued in the form of a chimney 5 out through the top of the camera casing. Also a tube 6 leads to the top of the boiler for conveniently feeding it with water, and a cap 7 closes this tube when the apparatus is in use. This cap is an ordinary check valve opening outward. It will prevent the entrance of air, for example, but will not prevent the escape of steam. Also practical constructions will have a gage or indicator to show when the water level in the boiler is too high, and a simple outlet pipe 8 is indicated and will serve practical requirements, as in filling any access of water flows out through this tube, thereby determining a proper level, whereupon the cap may be screwed up. These features may of course be modified in various ways to suit different practical outfits. Also, as part of the invention, the source of heat is of practical importance, and a fire-box 9 has been illustrated beneath the boiler, the same being a small lined box with suitable air openings 10, and containing an acetylene burner 11 supplied from a generator 12. This generator is detachably arranged, and further has a regulator 13 to control the gas jet.

The boiler is best located in a chamber 14 at one side of the chamber 15 containing the film and film controlling mechanism which chamber 15 may thereafter be termed the "film chamber." A circulatory system extends from the boiler, water pipes 16 being tapped into the boiler near the upper and lower levels of the water therein. The water will circulate through the pipes of the circulatory system thereby warming the air in the film chamber. At a point in the boiler preferably below the hottest portion of the water, a third tap 18 is taken off leading to the "swimmer" 19, this swimmer being a form of water gas or vapor generator.

In the best constructions embodying the invention the swimmer has the form of a vertical tube or stand pipe 20 into which the warm water is admitted at the bottom 21, and which contains a float 22 carrying at its upper end a needle valve 23. This float is guided by flanges 24 to move up and down in the tube, but gates 25 are provided to permit the free passage of water gas therepast. The float 22 of course takes a position partly submerged in the water, as shown in Fig. 3, and in practice it is weighted just enough to operate in a manner hereinafter described. This weighting is therefore important as a part of the practical operation. From the upper end of the swimmer the water gas is led into the film chamber 15 by pipe 27. Of course, the features illustrated may be modified, for example, by locating the swimmer directly in the film chamber, so that it may discharge freely.

The practical operation is as follows: The boiler 1 is of course suitably filled with water and the acetylene flame lighted. After a few minutes the water heats to the boiling point which fact is indicated by the blowing off of steam at the valve 7. At the same time the hot water will commence to pass through the circulatory system 16 warming the air in the film chamber. At this point it would be possible for steam to pass into the film chamber through the swimmer were it not for the fact that the steam pressure raises the water level in the swimmer and causes the needle valve 23 to close. Thus the presence of any mist, with the harmful effects already indicated, in the film chamber is avoided. The apparatus is now ready for regulation. The operator turns down the acetylene flame by the regulator 13 until a point is reached where steam ceases to escape. At this point it will be found that the heat is just sufficient to keep the water hot without boiling. Under these conditions the float in the swimmer falls, and as the swimmer tube is filled with hot water, water gas or vapor is generated very freely. This generation takes place in partial contact with the air it is true, but on account of the warmth of the water, which is raised well toward the boiling point, the water vapor passes off into the air with a freedom nearly or quite as great as it would do at ordinary temperatures in a partial vacuum. In fact, it is probable that the water vapor gas occupies the upper portion of the swimmer to the substantial exclusion of any air, so that conditions are like what has already been described as suitable to the efficient generation of water vapor. This water vapor, so generated, flows into the air of the film chamber, and mixes with it. The condition is, however, sharply distinguished from a condition where steam is generated. There is, of course, a sharp dividing line between the flowing of water vapor into air, and the actual displacement of air by steam. It is true steam is water vapor at a pressure above atmospheric, but it is very important that the water vapor be kept at a theoretical tension less than atmospheric, in order that it will mix with the air instead of displacing the air. This distinction, the importance of which will be very evident, must not be lost sight of. Every time the water boils to such an extent as to induce the production of actual steam the valve closes. Thus no steam gets into the film chamber, only water vapor mixing with the air, but not displacing it, and therefore it is non-condensing. By this means the humidity is quickly brought to any required degree, suitable to the best results.

In order that a suitable degree of water vapor may be present without actual saturation of the air, the warmth of the air is important and is provided for by the circulatory system. By the combined agencies of the circulatory system and the water generator or swimmer, the quantity of water vapor gas in the film chamber is kept sufficient to absolutely preclude any possibility of any kind of static or electrical markings. While it is not possible for this apparatus to get such condensation of steam in the film chamber as will fog the lens, still it is not desirable to risk supplying more water vapor than the air will take up. Therefore, it is best not to let the air become fully saturated. But the precautions necessary for this are easily taken, being easily within the skill of any ordinary operator. For example, any ordinary hygrometer in the camera casing would indicate when the saturation reached a certain per cent, whereupon the acetylene flame would be cut down or extinguished, and the picture immediately taken.

While the invention has been particularly described in a practical construction or constructions in such detail as to enable the same to be practically manufactured and used, it is not desired that the invention be particularly limited to this particular structure or structures since variations may be made without departing from its spirit and scope.

What is claimed is:—

1. In a motion picture camera, an appliance for preventing "static" or electrical markings, comprising a supply of hot water, and means for directly exposing a portion of such heated water to communication with the air in the film chamber at a temperature not exceeding the boiling point of water.

2. In a motion picture camera, an appliance for preventing "static" or electrical markings, comprising a supply of hot water, means for directly exposing heated water to communication with the air in the film chamber at a temperature not exceeding the boiling point of water, and means for warming the air in the film chamber.

3. In a motion picture camera, an appliance for preventing "static" or electrical markings, comprising a supply of hot water, means for directly exposing the heated water to communication with the air in the film chamber at a temperature not exceeding the boiling point of water, and a circulatory system for warming the air in the film chamber.

4. In a motion picture camera, an appliance for preventing "static" or electrical markings, comprising a generator for hot water, and means for directly exposing a portion of the heated water to communication with the air in the film chamber at a temperature not exceeding the boiling point of water.

5. In a motion picture camera, an appliance for preventing "static" or electrical markings, comprising a generator for hot water, means for directly exposing the heated water to communication with the air in the film chamber at a temperature not exceeding the boiling point of water, and means for warming the air in the film chamber.

6. In a motion picture camera, an appliance for preventing "static" or electrical markings, comprising a generator for hot water, means for directly exposing heated water to communication with the air in the film chamber at a temperature not exceeding the boiling point of water, and a circulatory system for warming the air in the film chamber.

7. In a motion picture camera, an appliance for preventing "static" or electrical markings, comprising a boiler, an acetylene burner therefor, means for regulating the supply of acetylene, and means for directly exposing heated water from the boiler to communication with the air in the film chamber at a temperature not exceeding the boiling point of water.

8. In a motion picture camera, an appliance for preventing "static" or electrical markings, comprising a boiler, an acetylene burner therefor, means for regulating the supply of acetylene, means for directly exposing heated water from the boiler to communication with the air in the film chamber at a temperature not exceeding the boiling point of water, and means for warming the air in the film chamber.

9. In a motion picture camera, an appliance for preventing "static" or electrical markings, comprising a boiler, an acetylene burner therefor, means for regulating the supply of acetylene, means for directly exposing heated water from the boiler to communication with the air in the film chamber at a temperature not exceeding the boiling point of water, and a circulatory system for warming the air in the film chamber.

10. In a motion picture camera, an appliance for preventing "static" or electrical markings, comprising a supply of hot water, and a tube or stand pipe connected to the hot water supply and adapted to expose heated water to communication with the air in the film chamber at a temperature not exceeding the boiling point of water.

11. In a motion picture camera, an appliance for preventing "static" or electrical markings, comprising a supply of hot water, a tube or stand pipe connected to the hot water supply and adapted to expose heated water to communication with the air in the film chamber at a temperature not exceeding the boiling point of water.

12. In a motion picture camera, an appliance for preventing "static" or electrical markings, comprising a supply of hot water, a tube or stand pipe connected to the hot water supply and adapted to expose heated water to communication with the air in the film chamber at a temperature not exceeding the boiling point of water, and means for warming the air in the film chamber.

13. In a motion picture camera, an appliance for preventing "static" or electrical markings, comprising a supply of hot water, a tube or stand pipe connected to the hot water supply and adapted to expose heated water to communication with the air in the film chamber at a temperature not exceeding the boiling point of water, and a circulatory system for warming the air in the film chamber.

14. In a motion picture camera, an appliance for preventing "static" or electrical markings, comprising a supply of hot water, a tube or stand pipe connected to the hot water supply, a valve above the level of the water in the stand pipe, and a float for controlling said valve whereby the heated water in the stand pipe is exposed to communication with the air in the film chamber at a temperature not exceeding the boiling point of water.

15. In a motion picture camera, an appliance for preventing "static" or electrical markings, comprising a supply of hot water, a tube or stand pipe connected to the hot water supply, a valve above the level of the water in said stand pipe, a float for controlling said valve whereby the heated water in the stand pipe is exposed to communication with the air in the film chamber at a temperature not exceeding the boiling point of water and means for warming the air in the film chamber.

16. In a motion picture camera, an appliance for preventing "static" or electrical markings, comprising a supply of hot water, a tube or stand pipe connected to the hot water supply, a valve above the level of the water in said stand pipe, a float for controlling said valve whereby the heated water in the stand pipe is exposed to communication with the air in the film chamber at a temperature not exceeding the boiling point of water, and a circulatory system for warming the air in the film chamber.

17. In a motion picture camera, an appliance for preventing "static" or electrical markings, comprising a supply of hot water, a tube or stand pipe connected to the hot water supply, a float guided in said tube, and a needle valve carried by said float, whereby the heated water in the tube is put in direct communication with the air in the film chamber at a temperature not exceeding the boiling point of water.

18. In a motion picture camera, an appliance for preventing "static" or electrical markings, comprising a supply of hot water, a tube or stand pipe connected to the hot water supply, a float guided in said tube, a needle valve carried by said float, whereby the heated water in the tube is put in direct communication with the air in the film chamber at a temperature not exceeding the boiling point of water, and means for warming the air in the film chamber.

19. In a motion picture camera, an appliance for preventing "static" or electrical markings, comprising a supply of hot water, a tube or stand pipe connected to the hot water supply, a float guided in said tube, a needle valve carried by said float, whereby the heated water in the tube is put in direct communication with the air in the film chamber at a temperature not exceeding the boiling point of water, and a circulatory system for warming the air in the film chamber.

Signed at city of New York in the county of New York and State of New York this 12th day of December A. D. 1913.

AXEL C. FORSBERG.
HERMAN C. SCHLICKER.

Witnesses:
A. S. ARONSON,
WM. B. GRAY.

Copies of this patent may be obtained for five cents each, by addressing the "Commissioner of Patents, Washington, D. C."